US005754665A

United States Patent [19]

Hosoi

[11] Patent Number: 5,754,665

[45] Date of Patent: May 19, 1998

[54] NOISE CANCELER

[75] Inventor: Yoshiaki Hosoi, Saitama, Japan

[73] Assignee: NEC Corporation, Tokyo, Japan

[21] Appl. No.: 879,907

[22] Filed: Jun. 20, 1997

Related U.S. Application Data

[63] Continuation of Ser. No. 607,466, Feb. 27, 1996.

[30] Foreign Application Priority Data

Feb. 27, 1995 [JP] Japan .................................... 7-038229

[51] Int. Cl.$^{6}$ ........................................ H04B 15/00

[52] U.S. Cl. ............................ 381/94.1; 381/947; 381/92

[58] Field of Search ............................ 381/71, 94.1, 93, 381/72, 168, 92, 94.7; 379/387, 390, 395, 437, 419

[56] References Cited

U.S. PATENT DOCUMENTS 4,589,137 5/1986 Miller ........................................ 381/94
4,672,674 6/1987 Clough ...................................... 381/71
5,471,538 11/1995 Sasaki ...................................... 381/94
5,473,702 12/1995 Yoshida .................................... 381/94
5,500,903 3/1996 Gulli ......................................... 381/92

FOREIGN PATENT DOCUMENTS 5191884 7/1993 Japan .

*Primary Examiner*—Minsun Oh Harvey
*Attorney, Agent, or Firm*—Sughrue, Mion, Zinn, Macpeak & Seas, PLLC

[57] ABSTRACT

The object of the noise canceler of the present invention is to allow hands-free conversation from either of two microphones through a parallel construction having two noise cancelers using FIR adaptive filters. When microphone 2 (at the driver's seat) is used for conversation, microphone 3 (at the passenger seat) is used for collecting noise and a noise-reduced voice signal 105 is obtained by using FIR adaptive filter 14; and when microphone 3 is used for conversation, microphone 2 is used for collecting noise and a noise-reduced voice signal 104 is obtained using FIR adaptive filter 13. These two voice signals 104, 105 are added at adder 17 and the result outputted as voice output signal 103.

3 Claims, 2 Drawing Sheets

NOISE CANCELER

This is a Continuation of application Ser. No. 08/607,466 filed Feb. 27, 1997.

BACKGROUND OF THE INVENTION

1. Field of the Invention

The present invention relates to a noise canceler, and particularly to an adaptive control noise canceler for hands-free conversation on an automobile telephone that suppresses a background noise component arising from travel of a mobile body that acoustically interferes with a voice signal.

2. Description of the Related Art

In the prior art, noise cancelers used for hands-free conversation in automobile telephones have been individually provided for each voice microphone and noise microphone.

FIG. 1 is a block diagram showing an example of the basic construction of a noise canceler of this type. Such a noise canceler 4 converts voice signal 112 from voice microphone 5 and noise signal 111 from noise microphone 6 into digital signals by means of A/D converters 41, 42, respectively; generates a cross-correlative noise signal by means of FIR (Finite Impulse Response) adaptive filter 43; and outputs noise signal 113. The noise canceler 4 further reduces noise by subtracting this noise signal 113 from the voice signal coming from voice microphone 5 by means of adder 44; returns the signal to an analog signal by means of D/A converter 45; and outputs output signal 114.

FIG. 2 is a block diagram showing the structure of an example of this type of noise canceler having improved characteristics as described in Japanese Patent Laid-open No. 191884/93. A noise canceler according to this example of the prior art has two adaptive control noise canceler sections 9, 10 arranged in a two-stage construction wherein noise is canceled by the two stages from voice signal 111 from voice microphone 7 and noise signal 112 from noise microphone 8, and output signal 115 is outputted. Such a device is particularly aimed at using a two-stage construction to improve characteristics by lessening the effect upon the voice signal caused by voice picked up by the noise microphone, and simultaneously, reducing the noise component to a minimum.

SUMMARY OF THE INVENTION

In the above-described example of the prior art, the voice microphone and noise microphone are each used in a fixed manner, and consequently, installation of the voice microphone at the driver's seat of an automobile and the noise microphone within the same automobile presents the problem that conversation is limited to the voice microphone, i.e., to the driver[s voice, and a passenger in the car is unable to converse. Moreover, such a device fails to completely solve the problem that voice mistakenly inputted to the noise microphone cancels the voice signal inputted to the voice microphone.

A noise canceler according to the present invention is provided with a first noise canceler that uses an FIR adaptive filter that receives as input signals, voice signals outputted when a first microphone is used by a speaker and noise signals outputted when a second microphone is used for noise collection; a second noise canceler that uses an FIR adaptive filter that receives, as input signals, noise signals outputted from the first microphone when the first microphone is used for noise collection and voice signals outputted from the second microphone when the second microphone is used by a speaker; and an adder that adds the output signals of the first and second noise cancelers.

In concrete terms, a noise canceler according to the present invention is provided with first and second A/D converters that convert voice signals and noise signals from first and second microphones, respectively, to digital signals;

a first FIR adaptive filter that generates and outputs noise signals from output signals of the second A/D converter these noise signals correlate with voice signals from the first microphone when the first microphone is used for voice and the second microphone is used for noise;

a second FIR adaptive filter that generates and outputs noise signals from output signals of the first A/D converter; these noise signals correlate with voice signals from the second microphone when the first microphone is used for noise and the second microphone is used for voice;

a first adder that adds noise signals from the first FIR adaptive filter and voice signals from the first microphone;

a second adder that adds noise signals of the second FIR adaptive filter and voice signals from the second microphone;

and a third adder that adds output signals of the first and second adders and outputs the result as an output signal.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

Figure 1:
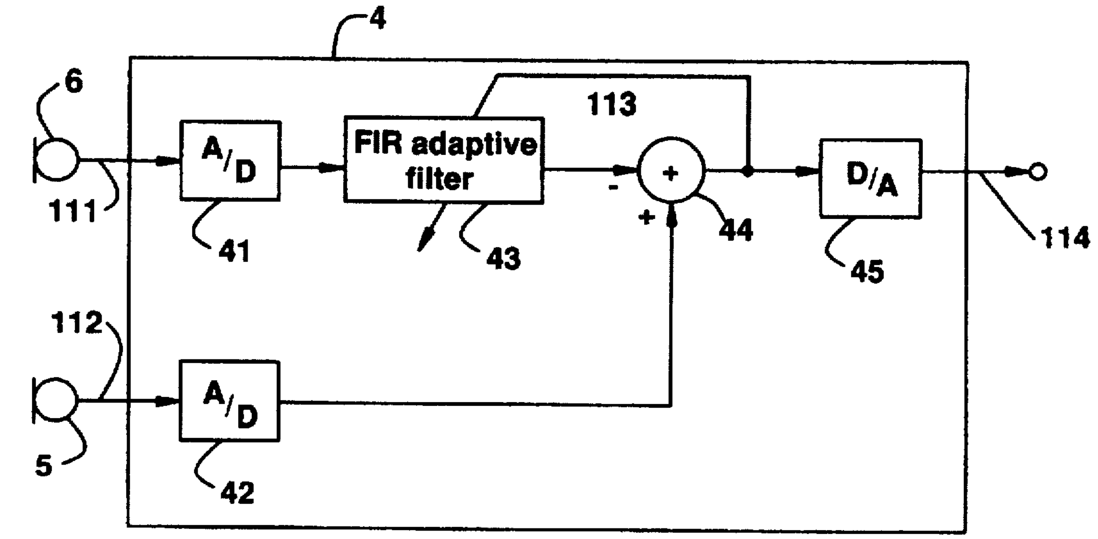
FIG. 1 Prior Art
FIG. 1 is a block diagram of the first example of the prior art.
Figure 2:
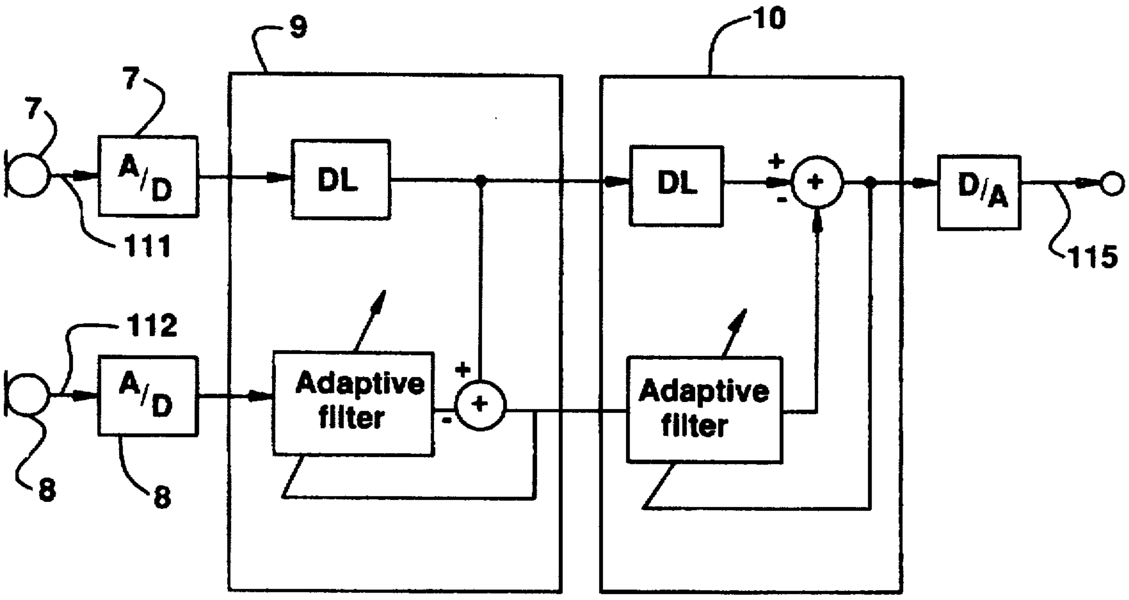
FIG. 2 Prior Art
FIG. 2 is a block diagram of the second example of the prior art.
Figure 3:
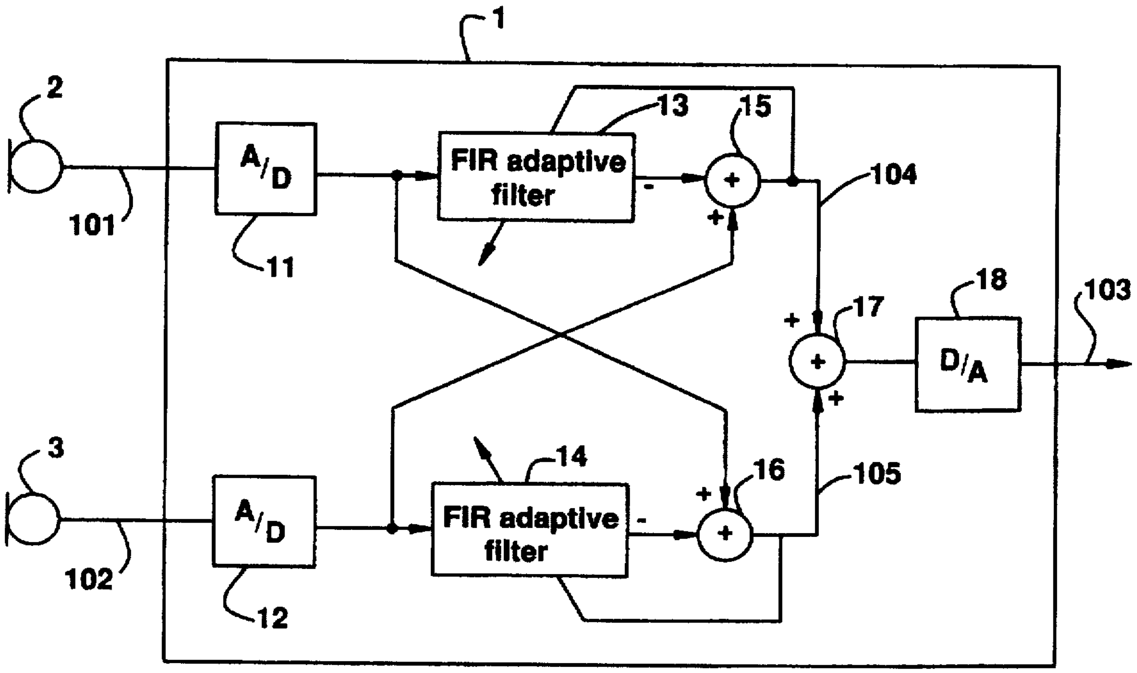
FIG. 3 is a block diagram of an embodiment of the present invention.

An embodiment of the present invention will next be explained with reference to the accompanying drawing. FIG. 3 is a block diagram showing an embodiment of the present invention. In the figure, microphone 2 is installed at the driver's seat of an automobile, and microphone 3 is installed at the passenger is seat.

The internal construction of noise canceler 1 is composed of A/D converters 11, 12 which convert signals 101, 102 from microphones 2, 3 to digital signals; adder 16 and FIR adaptive filter 14 which operate as a noise canceler when microphone 2 is used for speech and microphone 3 is used for noise; adder 15 and FIR adaptive filter 13 that operate as a noise canceler when microphone 2 is used for noise and microphone 3 is used for speech; adder 17 that adds the output signals of adder 16 and adder 15; and D/A converter 18 that returns the output signal of adder 17 to an analog signal and outputs the result as output signal 103.

As to the operation of this canceler, FIR adaptive filter 14 generates an estimated noise signal which is the estimated noise component contained in the voice signal of microphone 2 based on the noise signal from microphone 3. Adder 16 outputs noise-reduced output signal 105 by subtracting the estimated noise signal from the voice signal from microphone 2. This voice signal 105 is fed back as a residual signal for adapting FIR adaptive filter 14 and used as the coefficient update of the FIR filter for the next input.

In the same way, FIR adaptive filter 13 generates an estimated noise signal which is the estimated noise component contained in voice signal of microphone 3 based on the noise signal from microphone 2. Adder 15 outputs voice signal 104 in which noise is reduced by subtracting this estimated noise signal from the voice signal from microphone 3.

Adder 17 next adds the two noise-reduced voice signals 104, 105 and outputs to D/A converter 18. D/A converter 18 returns the added signals to an analog signal and outputs the result as voice output signal 103. In other words, this voice output signal 103 is the noise-reduced voice output signal when microphone 2 (driver's seat) is used for speaking or the noise-reduced voice output signal when microphone 3 (passenger seat) is used for speaking.

The noise canceler of the present invention according to the foregoing description is a construction that provides noise cancelers for voice signals from two microphones whereby whichever microphone is used for speech, the other operates for noise detection, thereby having the effect of enabling hands-free conversation from the driver's seat microphone as well as from the passenger seat microphone. In addition, even when voice is mistakenly inputted to the passenger seat microphone when the driver's seat microphone is being used for speech, the present invention has the effect of reducing the effect upon the voice output signal because voice from the passenger seat is added.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An adaptive control noise canceler system for a voice communication installation having first and second spaced microphones (2,3), either of which may receive a voice input from a speaker or a background noise input, said system comprising:

a) a first signal channel including, in series connection, a first A/D converter (11) having an input connected to the first microphone, a first FIR adaptive filter (13), and a first adder (15), b) a second signal channel including, in series connection, a second A/D converter (12) having an input connected to the second microphone, a second FIR adaptive filter (14), and a second adder (16), c) circuit means coupling an output of the first A/D converter to the second adder, and an output of the second A/D converter to the first adder, d) feedback means coupling an output of the first adder to an input of the first filter, and an output of the second adder to an input of the second filter, and e) a third adder (17) for combining the outputs of the first and second adders, f) wherein when the first microphone receives a voice input the second microphone serves as a noise detector, and vice versa.

2. A system according to claim 1, wherein the first and second microphones are disposed on a driver side and a passenger side of a motor vehicle, respectively.

3. A system according to claim 1, further comprising a D/A converter (18) having an input connected to an output of said third adder (17).

* * * * *